(12) United States Patent
Stolz (10) Patent No.: US 9,670,987 B1
(45) Date of Patent: Jun. 6, 2017

(54) CHAIN LINK USING A PRESSED-IN MEMBER

(71) Applicant: Caterpillar Inc., Peoria, IL (US)

(72) Inventor: Michael Robert Stolz, Franklin, WI (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/989,253

(22) Filed: Jan. 6, 2016

(51) Int. Cl.
*F16G 15/02* (2006.01)
*F16G 15/12* (2006.01)
*B21L 11/00* (2006.01)

(52) U.S. Cl.
CPC ........... *F16G 15/02* (2013.01); *B21L 11/00* (2013.01); *F16G 15/12* (2013.01)

(58) Field of Classification Search
CPC .......... F16G 15/04; F16G 15/02; F16G 15/12; B65G 27/005
USPC ............................................. 59/84; 198/853
See application file for complete search history.

(56) References Cited

U.S. PATENT DOCUMENTS

| | | | |
|---|---|---|---|
| 271,141 A * | 1/1883 | Simons | F16G 15/02 24/598.2 |
| 819,007 A * | 4/1906 | Dresler | F16G 15/02 24/598.2 |
| 1,672,867 A | 6/1928 | Bazeley et al. | |
| 1,776,515 A | 9/1930 | Leahy et al. | |
| 1,787,926 A * | 1/1931 | Allen | F16G 15/02 59/85 |
| 2,175,504 A | 10/1939 | Ehmann | |
| 2,382,344 A * | 8/1945 | St Pierre | F16G 15/02 59/85 |
| 2,398,897 A * | 4/1946 | St Pierre | F16G 15/02 59/85 |
| 2,537,405 A * | 1/1951 | Gilbert | F16G 15/02 59/85 |
| 3,994,127 A | 11/1976 | Gower | |
| 4,056,929 A | 11/1977 | Chrobak et al. | |
| 4,220,052 A * | 9/1980 | Sheldon | B65G 17/38 198/853 |
| 4,706,451 A | 11/1987 | Stromberg et al. | |
| 5,878,565 A * | 3/1999 | Grootveld | F16G 15/04 59/78 |
| 5,974,779 A | 11/1999 | Orscheln et al. | |
| 7,155,895 B2 | 1/2007 | Moehnke et al. | |
| 8,056,315 B2 | 11/2011 | Mulle et al. | |
| 8,756,907 B2 | 6/2014 | Briscoe et al. | |
| 8,757,887 B2 * | 6/2014 | Torii | B60B 27/0005 384/504 |
| 9,079,463 B2 | 7/2015 | Walenta | |
| 2008/0245049 A1 | 10/2008 | Pengg | |

* cited by examiner

*Primary Examiner* — David B Jones
(74) *Attorney, Agent, or Firm* — Law Office of Kurt J. Fugman, LLC (57) ABSTRACT

A method of forming a chain having a plurality of links that are formed from separate link members is provided that includes press fitting one link member into another link member. The method may further comprise cooling or heating one link member before completing the pressing operation.

14 Claims, 6 Drawing Sheets

CHAIN LINK USING A PRESSED-IN MEMBER

TECHNICAL FIELD

The present disclosure relates to chain assemblies that are constructed from links formed from separate parts. More specifically, the present disclosure relates to a dragline bucket chain assembly that includes a chain link that includes two members that are pressed into a subassembly.

BACKGROUND

Figure 1:
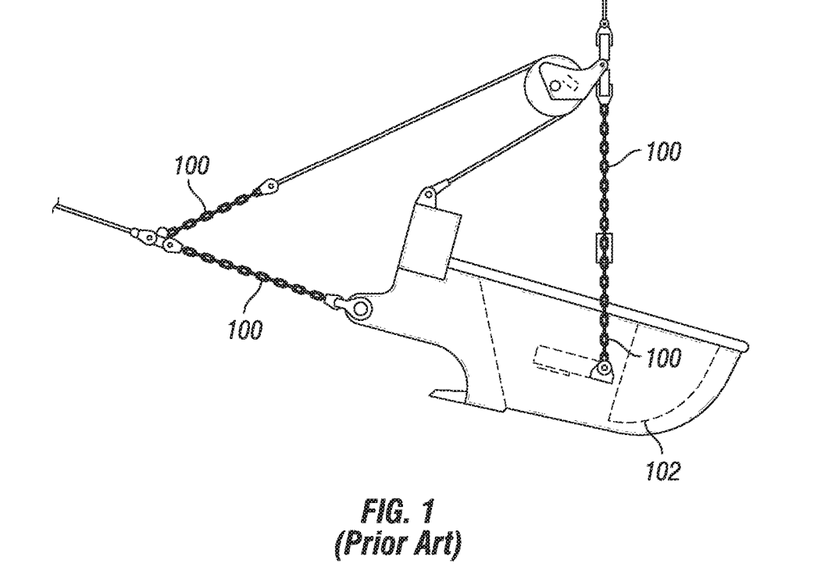
FIG. 1 is a side view of a dragline bucket that is suspended using chains as is known in the art.

Referring initially to FIG. 1, chains 100 have historically been used in dragline buckets 102 in the hoist and drag circuits. Some rigging configurations also use chains in the dump circuit (single dump block systems). Chains 100 have in the past been cast, forged, comprised structural plate, etc.

Figure 2:
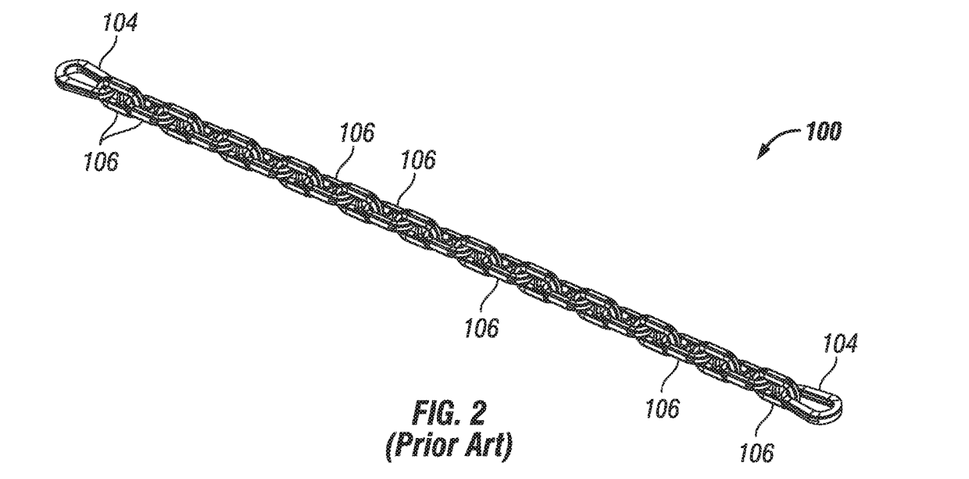
FIG. 2 is a perspective view of a chain such as that used in FIG. 1 shown in isolation from a bucket or any other apparatus, giving an example of a chain that is totally cast.

Looking now at FIG. 2, an example of a dragline bucket chain 100, which is cast as one assembly is shown. The drawbacks to this design include the amount of time it takes to cast the chain, the obstacles with pouring the chain and avoiding casting defects, heat treating the entire length of the chain as well as the space needed to quench the chain, and the time to model the chain assembly. In particular, the length of the apparatus used in heat treating the chain may be undesirably long and expensive to construct as well as take up valuable space. As can be seen, a typical chain 100 includes two end links 104 and a plurality of intermediate or body links 106, all of which are intertwined or interlocked to form the chain. The addition or subtraction of the intermediate or body links makes the chain longer or shorter as desired.

Figure 3:
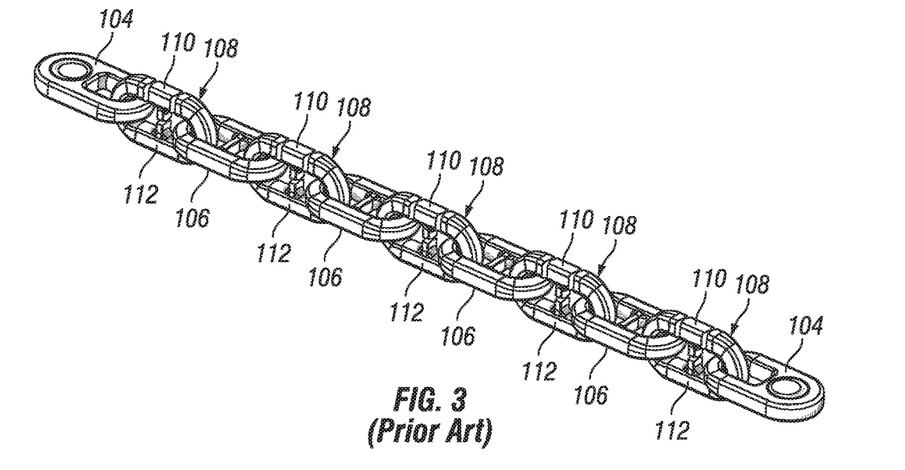
FIG. 3 is a perspective view of a chain that is fabricated using welded-in T sections as is known in the art.
Figure 4:
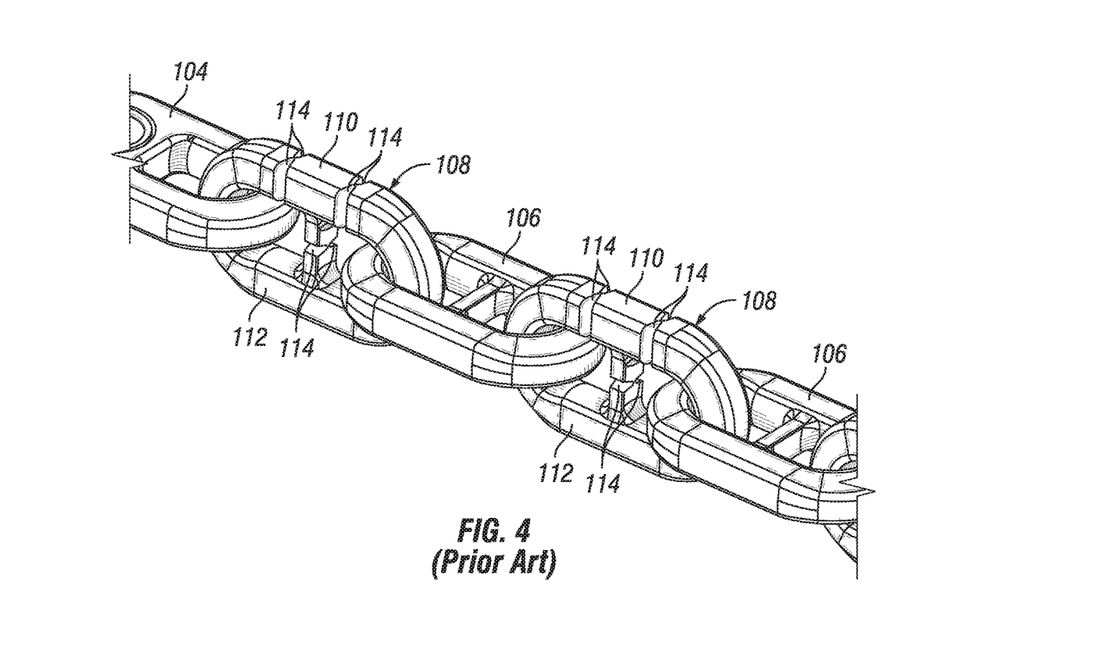
FIG. 4 is an enlarged view of the chain of FIG. 3 to show more clearly the welded-in T sections.

A previous solution to these problems has been to cast the individual links 108 with weld-in sections 110 used on every other link as shown in FIGS. 3 and 4. In practice, the weld-in sections are integrally cast with thinned portions connecting them to the main link member 112. They are then pressed out so that the main link 112 member may be joined to adjacent fully cast links 106 on either side. Then, the weld-in section 110 is replaced and adhered to the main link member 112 using a welding process. As best seen in FIG. 4, grooves 114 are provided into which the welded material is placed to create a welded seam. However, welding in the sections of the chain is time consuming and labor intensive. Furthermore, the selection of the proper weld electrode is critical and any mistakes may lead to undesirable scrap. Also, the welded seams need to withstand the abrasion associated with surface mines and may not be suitably durable over time.

Accordingly, it is desirable to develop a better method for manufacturing chain links than has yet been devised.

SUMMARY OF THE DISCLOSURE

A chain link subassembly having an enclosed perimeter that includes a main link member and a press-in link member is provided. The main link member may define the majority of the perimeter of the subassembly and may include at least one interlocking feature. The press-in link member may define a minority of the perimeter of the subassembly and may include at least one interlocking feature that is at least partially complimentary shaped to the interlocking feature of the main link member. The corresponding interlocking features of both members may define a plurality of surfaces and at least two of those surfaces may be configured to create an interference with each other during a pressing operation.

A chain assembly is provided that includes at least one integrally cast link and at least once fabricated link that comprises two link members that are press fit together. At least one of the link members may include one projection and the other link member may include two projections that are positioned diagonally from each other from one link member to another link member. The projections may be configured to act as interlocking features A method of forming a chain having a plurality of links that are formed from separate link members is provided that includes press fitting one link member into another link member. The method may further comprise cooling or heating one link member before completing the pressing operation.

DETAILED DESCRIPTION

The solution is to have a two piece link joins whole body links together. The joining process involves a "tee" section that is press fit (every other link) to make a chain assembly. This allows the ability to cast individual components, heat treat to the desired specification then assemble the chains. This also will eliminate the welding aspect to assemble the chain links together, thus saving time and assembly cost. The press fit allows for load transfer within the individual link assembly, eliminates welding, and eliminates the need to cast the chain as a single assembly. It also allows for final heat treating to be conducted prior to chain assembly. The chain may then be painted and placed into distribution.

Figure 5:
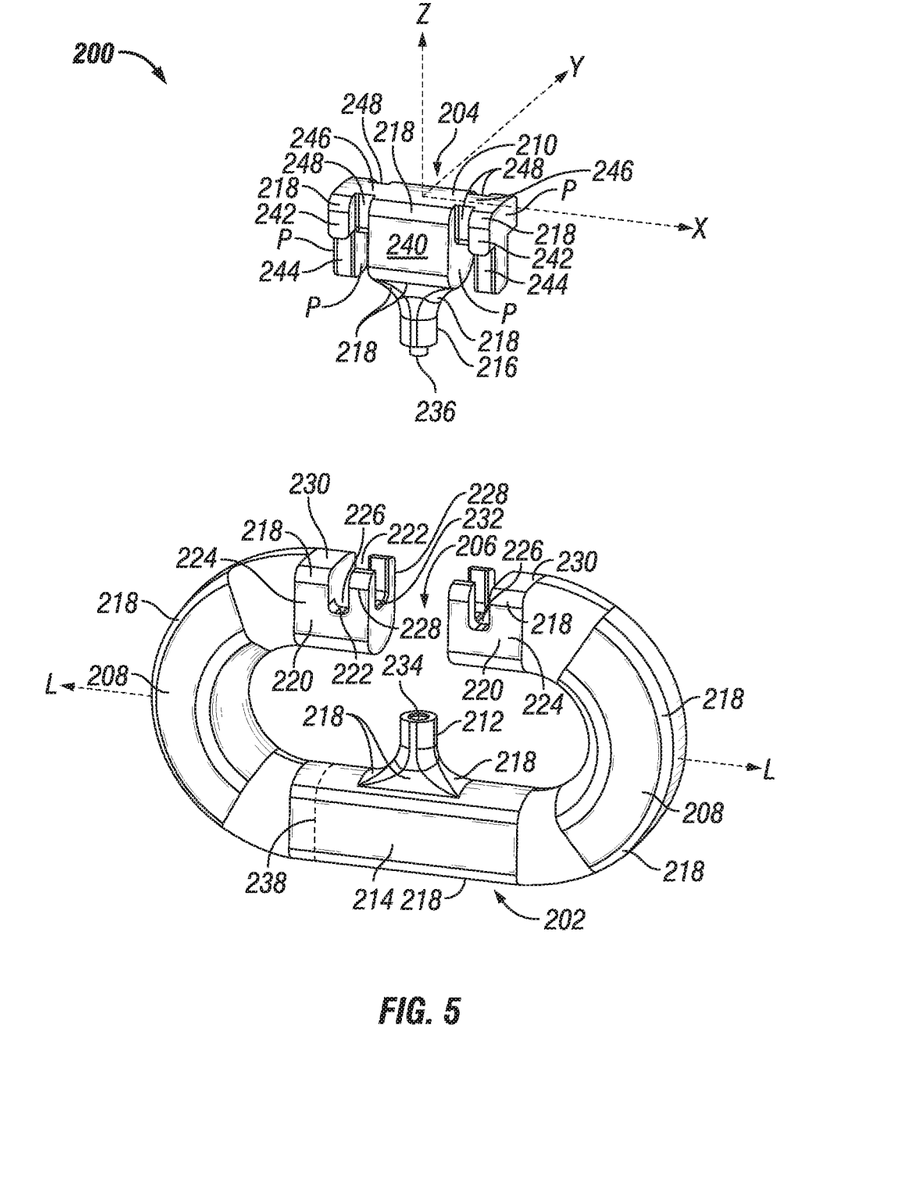
FIG. 5 is a perspective view of a chain link that includes a main link member and a press-in link member according to an embodiment of the present disclosure.
Figure 6:
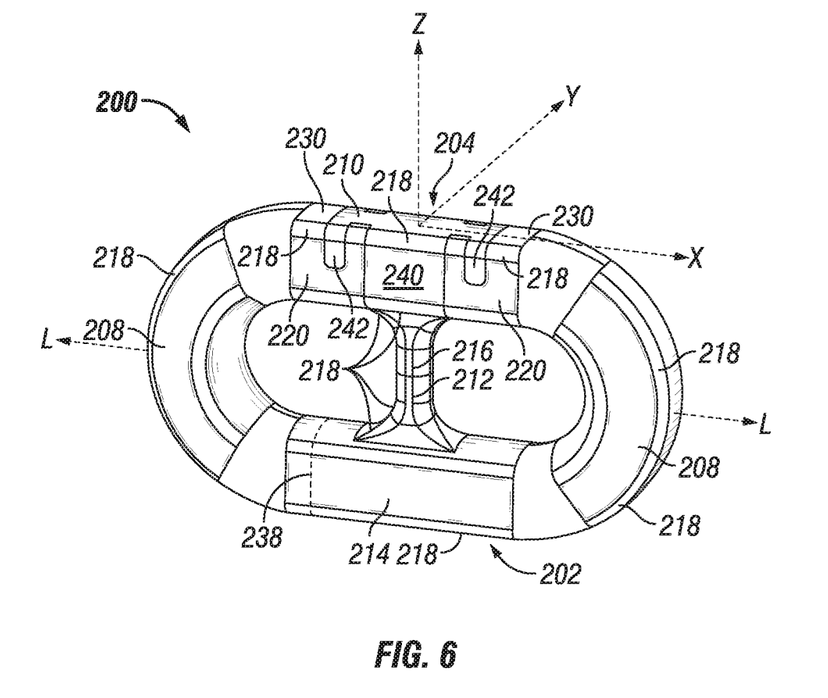
FIG. 6 is a perspective view of the chain link of FIG. 5 showing the press-in link member actually pressed into the main link member, completing a full chain link.

Focusing now on FIGS. 5 and 6, a chain link subassembly 200 according to an embodiment of the present disclosure is shown. The chain link subassembly 200 includes a main link member 202 and a press-in member 204 or connecting member that is intended to be attached to the main link member 202 using a pressing process. Both members may be cast and then attached as will be described in more detail later in this disclosure. They may be manufactured in other ways if so desired.

The main link member 202 has a body forming a substantially oval shaped perimeter that defines a gap 206 for receiving the press-in member 204. At opposite ends of the main link member 202, C-shaped ends 208 are formed that are curved and are configured to mate with similarly shaped features on adjacent chain links. A Cartesian coordinate system is provided that includes X, Y, Z coordinates and is centered on the top surface 210 of the press-in member 204 and defines planes of symmetry for the main link member 202. Specifically, the main link member 202 is symmetrical about the X-Z plane and the Y-Z plane and defines the majority of the perimeter of the subassembly.

Load vectors L are displayed showing how the chain link is normally loaded when used as part of a chain assembly. A partial strut 212 extends from the lower straight portion 214 of the main link member 202 in the positive Y direction toward the gap and connects with a partial strut 216 of the press-in link member 204 once assembled, to provide support for the chain link to help prevent necking of the chain link when it is highly loaded. More specifically, the strut is put under a compressive load as the oval shaped chain link is highly loaded in tension, which tends to cause the straight portions of the chain link to neck down toward each other. Additional features, include various blends 218 that join adjacent surfaces. These blends 218 serve several functions including the reduction of stress when the chain link is loaded, prevention of snag points when the chain rides against an obstruction, and improved filling during the casting process helping to prevent manufacturing defects.

Features that facilitate the receiving of the connecting member using a pressing operation will now be discussed. Opposite of the straight portion 214 and strut 212 that is centered on that straight portion 214, one can see a gap 206 that is straddled on either side by bridge portions 220 that include a plurality of interlocking features that are generally complimentary shaped to those of the press-in member 204 for engaging them, holding the chain link subassembly 200 together. As will be discussed in more detail later, both sets of interlocking features define a plurality of surfaces and at least two of those surfaces are configured to create interference with each other during a pressing operation.

Looking more closely at these features on the left instance of the bridge portion 220, they include recesses 222 that are defined by the portion of the bridge 220 that is nearest the C-portion 208 of the main link member 202. The two recesses 222 closest to the side surfaces 224 of the main link member 202 are more shallow than the center recess 226 that is deeper. These interlocking features also include two protrusions 228 that are immediately adjacent the free end of the bridge portion 220. The two protrusions 228 are immediately adjacent the side surfaces 224 of the main link member 202 and extend to the same height as the top surface 230 of the bridge portion in the Z direction. The protrusions 228 are joined by an inner recessed surface 232 that is at the same height as the bottom surfaces of the outer recesses 222 in the Y direction. These various interlocking features may be described as being configured like a three dimensional checkerboard pattern with an additional deep recess 226.

Put into other words, the projections and recesses may be said to be diagonal to each other in an X-Y plane. The more shallow recesses 222 extend approximately half-way through the height of the bridge portion 220 in the negative Z direction. The width of one of the protrusions 228 may be at least 0.25 inches in the X direction and the length may be a third of the width of the chain in the Y direction. Looking along the X axis, projections 228 and recess 232 form a substantially U-shaped configuration.

A pilot hole 234 is positioned on the top surface of the strut portion 212 of the main link member 202 that is at least partially complimentary shaped to a pilot feature 236 of the press-in member 204 that will be discussed shortly. A lead-in feature such as a chamfer may be present immediately around the perimeter of the pilot hole if so desired or on the corresponding pilot feature of the press-in link member. Male and female pilot features may be exchanged from the main link member to the press-in link member or vice versa if desired.

Here are some exemplary dimensions of the main link member 202. The overall length of the main link member 202 in the X direction may range from 4 to 40 inches and the overall height of the main link member may range from 2 to 20 in the Z direction. Often, there is a two to one ratio concerning the length of the chain link in the X direction versus its height in the Y direction. A length of the strut member 212 in the X direction and height in the Z direction may be a quarter of the width of the gap (this gap is the distance from the inner arcuate surface of one C-shaped end to the inner arcuate surface of the other C-shaped end, which may range from 4 to 38 inches for example) and the width of the strut member in the Y direction may be about half the thickness of the chain in the Y direction. The dimensions of the main cross-section 238 of the main link member 202 may be substantially constant around the oval perimeter and may include a thickness in the Y direction of about half an inch and a height in the Z direction of about an inch. The thickness of the chain in the Z direction may range from one to seven inches.

Focusing now on the press-in or connecting link member 204, it may be generally characterized as being substantially complimentary shaped to the main link member 202 in order to form a full link member that is similarly configured to those known in the art. That is to say, if the main link member 202 of FIGS. 5 and 6 were subtracted from a cast link construction 106 described in FIG. 2 or 3, the resulting member would be configured similarly to the press-in link member 204 of FIGS. 5 and 6. The press-in link member 204 is also symmetrical about the X-Z and Y-Z planes and defines a minority of the perimeter of the chain link subassembly.

The press-in link member 204 has a substantial T section configuration that includes a main body portion 240 that has a similar cross-sectional shape and dimensions as the main cross-section 238 of the main link member 202. A strut portion 216 extends in the negative Z direction from the main body portion 240 that is similarly configured as the strut portion 212 of the main link member 202. It includes a pilot protrusion 236 that extends from its free end and that is at least complimentary shaped to the pilot hole 234 of the strut member 212 of the main link member 202. The perimeter of the pilot protrusion may have any desirable shape such as oval, circular or rectangular with rounded corners. If a rectangular profile is used, then its dimension in the X direction may be may be slightly less that the X dimension of the strut and its dimension in the Y direction may be slightly less than the Y dimension of the strut. Slight clearance on the order of 0.005 of an inch may be provided to ease installation of the pilot protrusion into the pilot hole. The free ends of both strut portions are designed line to line so that they abut after the pressing operation.

The press-in link member 204 also includes interlocking features on either side of the main body portion 240 that are complimentary shaped to the interlocking features of the bridge portions 220 of the main link member 202. Two smaller protrusions 242 are located proximate the side surfaces of the press-in link member 204 that mate with the corresponding recesses 222 of the bridge portion 220 of the main link member 202. A center protrusion 244 extends into the deeper recess 226 of the bridge portion 220 and bottoms out or nearly contacts the bottom surface of this recess. The center protrusion 244 extends 0.375 of an inch minimum from the top surface 210 in the negative Z direction and a third of the thickness of the chain in the Y direction. A connecting portion 246 connects the center projection 244 to the main body portion 240 and partially defines side pockets 248 that accept the protrusions 228 of the bridge portion 220 of the main link member 202. The center projection may be said to be closer to the C-shaped end portion of the main link member than the projections of the main link member. Looking along the X axis, the protrusions 242 and 244 have a substantial T-shaped configuration.

The various surfaces of the interlocking portions of both link members are designed line to line or in some cases with a slight interference fit that may range from 0.002 of an inch to as much as 0.005 of an inch or more on a side if needed or desired. It is contemplated that it may be desirable to provide such an interference fit on surfaces that are substantially perpendicular to the load direction, which in this case, is in the X direction. Examples of such surfaces are identified in FIG. 5 by the letter P. Other surfaces may or may not be provided with an interference fit.

Any of the dimensions, tolerances and fits may be varied as desired or needed. It is further contemplated that any of the features, components, associated dimensions, fits and tolerances may be scaled up or down on a proportional basis to create further embodiments of the present disclosure of various sizes. Also, embodiments that lack symmetry are also considered to be within the scope of the present disclosure.

FIG. 6 illustrates that the chain link subassembly 200 looks virtually identical to a completely cast link once the pressing operation is completed.

INDUSTRIAL APPLICABILITY

Figure 7:
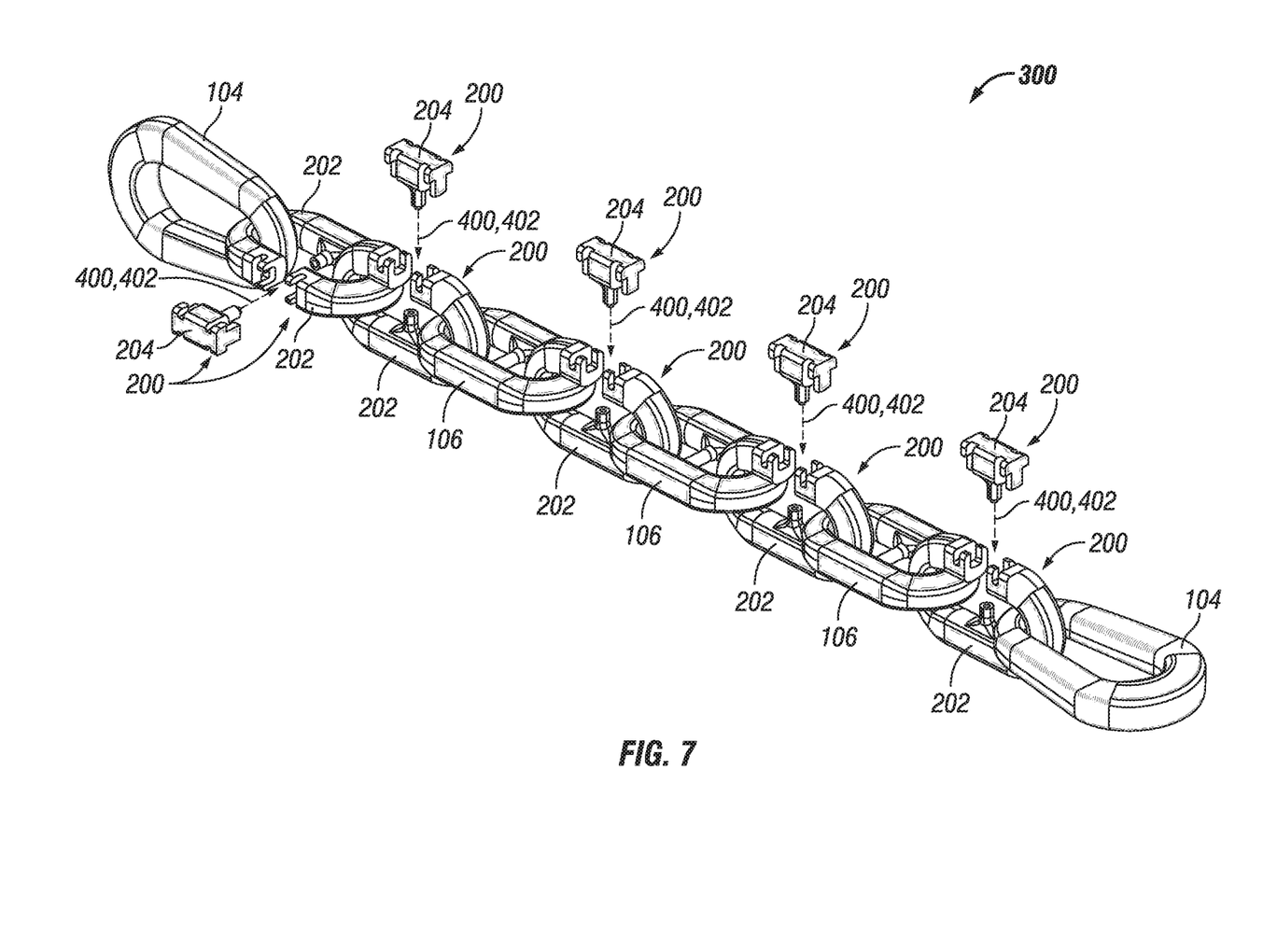
FIG. 7 is an exploded assembly view of a chain that is fabricated using a plurality of the chain link illustrated in FIG. 5.

The chain link subassembly as just described may be used as follows and illustrated by FIG. 7 to create a chain assembly.

First, the desired configuration of the chain 300 is determined. This may include choosing what type of end links 104 are to be used and the length of the chain. Next, the necessary components are obtained or are otherwise provided. The components may be bought, sold, or manufactured, already present in the field, etc. In a commercial manufacturing environment, the end links 104 and standard intermediate or body links 106 may be manufactured using a casting process.

Similarly, the main link members 202 and press-in link members 204 necessary to make a chain link subassembly 200 as has just been described may also be manufactured using a casting process. The various links are then intertwined or interlocked until the desired configuration of the chain is virtually achieved. Finally, each press-in member 204 is pressed into the corresponding main link member 202 (see step 400 in FIG. 7) in a manner that has just been described. It may be necessary to cool (represented by step 402 in FIG. 7) the press-in link member in liquid nitrogen to shrink its dimensions to make it easier to press into the main link member 202. Once it reaches ambient temperature again, the resulting increase in interference provides a very robust connection between the press-in link member and the main link member. Alternatively, the main link member may be heated in order to ease the pressing operation.

Figure 8:
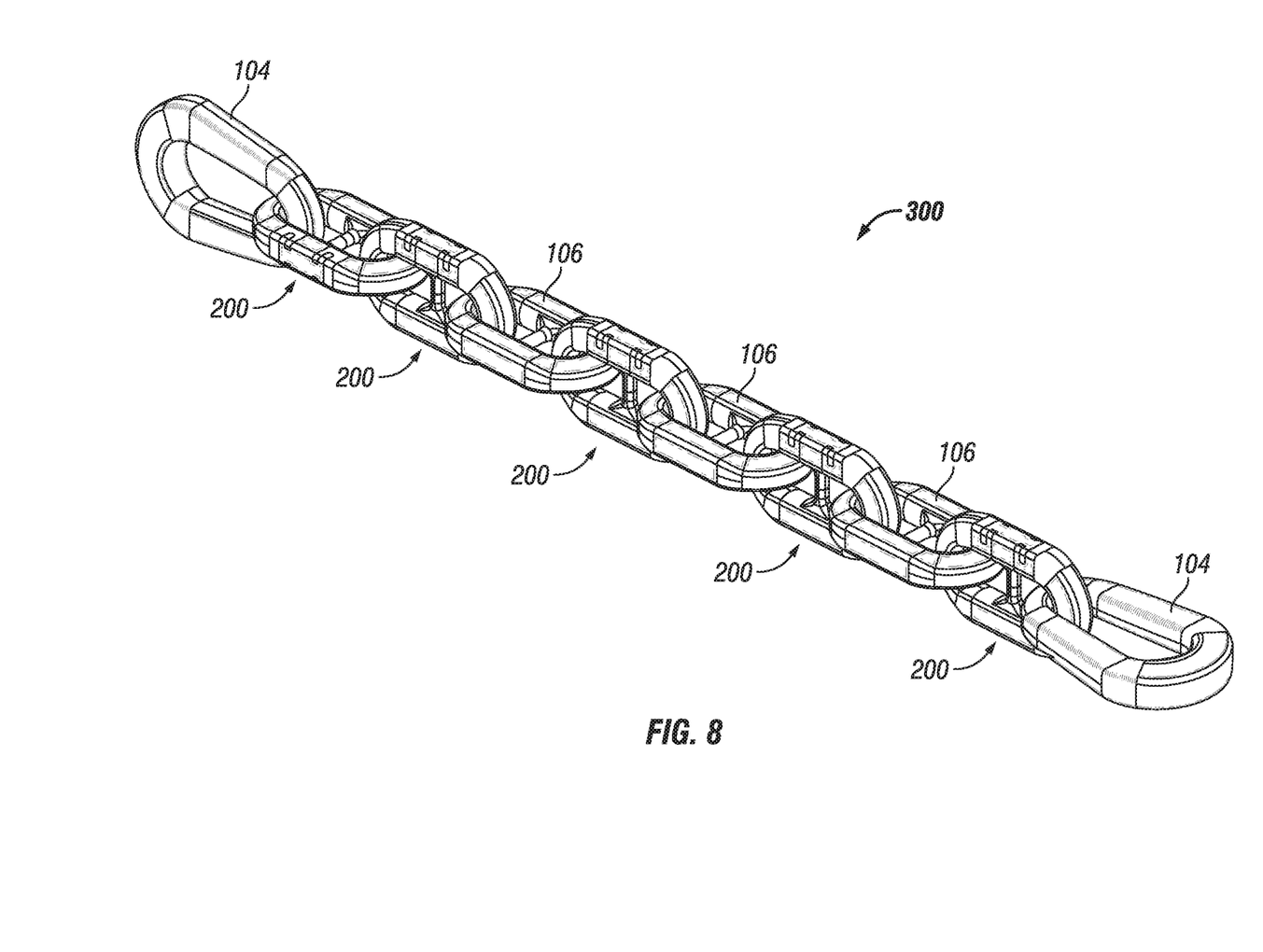
FIG. 8 is a perspective view of a completed chain assembly that is created after assembling the chain of FIG. 7 using multiple pressing operations.

FIG. 8 illustrates what the final chain assembly 300 would look like. In some cases, additional operations such as pressing bushings into the end links, painting the chain assembly, etc. may take place before placing the chain assembly into distribution.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A chain link subassembly having an enclosed perimeter, the subassembly comprising:
    a main link member that defines the majority of the perimeter of the subassembly and that includes at least one interlocking feature; and
    a press-in link member that defines a minority of the perimeter of the subassembly and includes at least one interlocking feature that is at least partially complimentary shaped to the interlocking feature of the main link member, wherein the corresponding interlocking features of both members define a plurality of surfaces and at least two of the surfaces are parallel to each other and are configured to create interference with each other during a pressing operation, and wherein the press-in link member is retained to the main link member by an interference fit.

2. The chain link subassembly of claim 1, wherein the main link member further comprises two opposing C-shaped end portions and a straight portion that connects the two C-shaped end portions, and two bridge portions that extend from opposite C-shaped end portions that define a gap between the bridge portions, wherein each bridge portion includes a plurality of interlocking features.

3. The chain link subassembly of claim 2 wherein the main link member includes a partial strut that extends from the straight portion in a direction toward the gap.

4. The chain link subassembly of claim 3, wherein the partial strut defines a pilot feature.

5. The chain link subassembly of claim 1, wherein the press-in link member comprise a general T-section configuration that includes a main body portion and a plurality of interlocking features on either side of the main body portion.

6. The chain link subassembly of claim 5, wherein the press-in link member further comprises a partial strut that extends from the main body portion.

7. The chain link subassembly of claim 6, wherein the partial strut of the press-in link member further includes a pilot feature.

8. The chain link subassembly of claim 4 or 7, wherein the pilot feature includes a partially rectangular perimeter.

9. The chain link subassembly of claim 2 or 5 wherein the plurality of interlocking features includes either a plurality of recesses or projections on each member.

10. The chain link subassembly of claim 9 wherein the chain link subassembly defines a load vector and the plurality of interlocking features of the press-in member and main link member define a plurality of surfaces that are substantially perpendicular to the load vector of the chain link subassembly, wherein the surfaces comprise areas of interference.

11. The chain link subassembly of claim 10 wherein the interlocking features of the press-in link member include two small protrusions and a center protrusion between the two smaller protrusions that extends further away from the press-in link member than the small protrusions.

12. The chain link subassembly of claim 9 wherein the plurality of interlocking features includes two projections on the main link member immediately adjacent the gap and one projection on the press-in member that is closer to the C-shaped end portion of the main link member than the two projections of the main link member.

13. A chain assembly comprising:

at least one integrally cast link; and at least one fabricated link that includes two link members pressed fit together defining a load vector, wherein at least one link member includes one projection and the other link member includes two projections and the projections are positioned diagonally from each other along a plane perpendicular to the load vector from one link member to the other link member and are configured to act as interlocking features, and the projections define a plurality of surfaces that are substantially perpendicular to the load vector and are configured to create areas of interference to retain one link member to the other link member by an interference fit.

14. The chain assembly of claim 13 wherein the fabricated link is not fastened together using a fastener.

\* \* \* \* \*